US006977870B2

(12) United States Patent
Fujimaki et al.

(10) Patent No.: US 6,977,870 B2
(45) Date of Patent: Dec. 20, 2005

(54) OPTICAL HEAD HAVING LIGHT REFLECTION PREVENTION FILM, AND OPTICAL INFORMATION PROCESSING APPARATUS INCORPORATING THE SAME

(75) Inventors: Tohru Fujimaki, Kawasaki (JP);
Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 10/102,183

(22) Filed: Mar. 20, 2002

(65) Prior Publication Data

US 2003/0123334 A1 Jul. 3, 2003

(30) Foreign Application Priority Data

Dec. 27, 2001 (JP) .............................. 2001-395973

(51) Int. Cl.[7] ............................................ G11B 11/00
(52) U.S. Cl. ............................. 369/13.13; 369/112.25
(58) Field of Search ...................... 369/13.13, 112.01, 369/112.23, 112.24, 112.25, 13.14, 13.17, 369/13.22, 13.23, 112.26

(56) References Cited

U.S. PATENT DOCUMENTS

| 6,633,513 | B1 * | 10/2003 | Kim et al. | 369/13.13 |
| 6,683,846 | B2 * | 1/2004 | Kishima et al. | 369/286 |
| 6,687,196 | B1 * | 2/2004 | Ueyanagi | 369/13.33 |
| 6,721,262 | B1 * | 4/2004 | Jordache et al. | 720/672 |
| 6,781,926 | B2 * | 8/2004 | Ishizaki et al. | 369/13.13 |

FOREIGN PATENT DOCUMENTS

| EP | 910 078 | 4/1999 |
| JP | 2001-235603 | 8/2001 |

* cited by examiner

Primary Examiner—Paul W. Huber
(74) Attorney, Agent, or Firm—Greer Burns & Crain, Ltd.

(57) ABSTRACT

An optical head has objective lenses that converge a light beam, a light-emitting surface that faces an optical recording medium with an air layer therebetween and from which the light beam converged by the objective lenses exits towards the optical recording medium, and a light reflection preventing film that is provided at the light-emitting surface. A recess is formed in the light-emitting surface, and the light reflection preventing film is provided inside the recess.

14 Claims, 4 Drawing Sheets

OPTICAL HEAD HAVING LIGHT REFLECTION PREVENTION FILM, AND OPTICAL INFORMATION PROCESSING APPARATUS INCORPORATING THE SAME

BACKGROUND OF THE INVENTION

1. Field of the Invention

The present invention relates to an optical information processing apparatus for carrying out recording of data to and playback of data from an optical recording medium, and to an optical head used as a constituent component of the optical information processing apparatus.

When merely 'optical recording medium' is stated in this specification, this is deemed to include not only optical recording media but also magneto-optical recording media. When 'optical information processing apparatus' is stated in this specification, this thus includes magneto-optical disk apparatuses that carry out recording of data to and playback of data from a magneto-optical recording medium such as a magneto-optical disk. Moreover, when 'optical head' is stated in this specification, this is deemed to include magneto-optical heads.

2. Description of the Related Art

An example of a conventional optical head is shown in FIG. 5. In this optical head He, two objective lenses 91 and 92 are held in a lens holder 90, and a planar lens surface 92a of the objective lens 92 faces an optical disk D with an air layer 94 therebetween. Laser light that has traveled from a light source not shown in FIG. 5 is converged by the objective lenses 91 and 92, thus forming a beam spot on the optical disk D.

In such an optical head He, the lens surface 92a corresponds to the interface between the objective lens 92 and the air layer 94, which have different refractive indices to one another, and hence a phenomenon occurs in which some of the laser light that has traveled through the objective lens 92 is reflected by the lens surface 92a upon reaching the lens surface 92a. If the amount of the laser light reflected by the lens surface 92a is large, then the efficiency of irradiation of light onto the optical disk D will be poor, and hence it is desirable to reduce the amount of reflection. A light reflection preventing film 93 has thus conventionally been provided either over the whole of the lens surface 92a or else over the part of the lens surface 92a through which the laser light passes.

However, with this conventional means, there are problems such as the following.

The gap between the optical head He and the optical disk D is set to be very small, and hence the optical head He and the optical disk D may contact one another due to the optical disk D shaking while rotating or due to warping. In particular, if a floating slider method is adopted in which the optical head He is made to float up from the optical disk D when the optical disk D rotates, then the optical head He may contact the optical disk D when the optical disk D stops rotating. However, conventionally the light reflection preventing film 93 has merely been provided in an exposed state on the lens surface 92a facing the optical disk D. Conventionally, problems have been prone to occur, such as when the optical head He and the optical disk D contact one another, the light reflection preventing film 93 may contact the optical disk D directly and may be damaged, or even if the light reflection preventing film 93 does not contact the optical disk D directly, the light reflection preventing film 93 may peel off from the lens surface 92a due to the shock caused by the contact between the optical head He and the optical disk D.

In the case that the optical head is constituted as a magneto-optical head having a magnetic field generating coil (not shown in FIG. 5), it is necessary to prevent thermal damage to the coil during the manufacturing process of the magneto-optical head, and hence the formation of the light reflection preventing film 93 by vapor deposition or sputtering is carried out in a relatively low temperature atmosphere. However, this results in lower adhesiveness of the light reflection preventing film 93. As a result, the light reflection preventing film 93 becomes yet more prone to being damaged when the optical head He and the optical disk D contact one another.

SUMMARY OF THE INVENTION

With the foregoing in view, it is an object of the invention of the present application to provide an optical head and optical information processing apparatus, for which damage to a light reflection preventing film can be suitably prevented, and hence the efficiency of irradiation of light onto an optical recording medium can be kept high for a prolonged period.

To attain the above object, the following technical means are adopted by the present invention.

According to a first aspect of the present invention, there is provided an optical head including: an objective lens; a light-emitting surface that faces an optical recording medium and from which a light beam converged by the objective lens exits towards the optical recording medium; and a light reflection preventing film that is provided at the light-emitting surface. The light-emitting surface is formed with a recess in which the light reflection preventing film is provided. Preferably, the light reflection preventing film may be provided so as not to project out from the recess.

According to the above constitution, even if a situation occurs in which the optical head contacts the optical recording medium, the light reflection preventing film will not directly contact the optical recording medium, and hence damage to the light reflection preventing film due to such contact can be prevented. Moreover, according to the structure in which the light reflection preventing film is provided inside the recess, even if a shock occurs when the optical head and the optical recording medium contact one another, the light reflection preventing film will not readily peel off due to this shock. According to the above constitution, the occurrence of damage to and peeling off of the light reflection preventing film can thus be reduced, and hence the efficiency of light irradiation can be raised using the light reflection preventing film.

Preferably, the depth of the recess may be at least $\frac{1}{4}n$ times the wavelength of the light beam, where n is the refractive index of the light reflection preventing film. Taking the refractive index of the member in which the recess is formed to be $n_g$, the refractive index n of the light reflection preventing film, when in single-layer form, can be determined from the relational expression $n=\sqrt{n_g}$. The reflectance of light of wavelength $\lambda$ is minimized when the formula $n \cdot d = \lambda/4$ is satisfied, where $\lambda$ is the wavelength of the light beam and d is the thickness of the reflection preventing film. It thus becomes clear that if the depth of the recessed part is no smaller than $\frac{1}{4}n$ times the wavelength of the light beam, then a light reflection preventing film of corresponding thickness can be suitably provided inside the recessed part without projecting out from the recessed part, and if the thickness of the light reflection preventing film is thus set, the amount of light reflectance is minimized. Strictly, this applies only when the light reflection preventing film is a single layer. However, the light reflection preventing film can also be made to have a multi-layer structure according to the present invention.

Preferably, the optical head of the present invention may further include a magnetic field generating coil and a transparent insulating protective film that covers the coil. The coil is disposed between the objective lens and the optical recording medium and provided with a central light-transmitting part for transmitting light converged by the objective lens. The insulating protective film includes a surface serving as the light-emitting surface. In this way, the optical head of the present invention can be constituted as a magneto-optical head provided with a magnetic field generating coil.

Preferably, the objective lens may include a lens surface serving as the light-emitting surface. In this case, the recess for accommodating the reflection preventive film is formed in the lens surface.

Preferably, the optical head of the present invention may further include a slider that holds the objective lens and floats up from the optical recording medium when the optical recording medium rotates. In the case that the optical head is made to be of such a so-called floating slider type, there is a risk of the optical head and the optical recording medium contacting one another when the optical recording medium stops rotating. Hence, applying the present invention to such a type of optical head is particularly desirable in terms of protecting the light reflection preventing film.

According to a second aspect of the present invention, there is provided an optical information processing apparatus including a suspension and an optical head supported by the suspension. The Optical head includes an objective lens for converging a light beam, a light-emitting surface for allowing the light beam to exit towards an optical recording medium, and a light reflection preventing film. The light-emitting surface is formed with a recess in which the light reflection preventing film is provided. Clearly this structure enjoys the same advantage as stated above with reference to the optical head.

Other features and advantages of the invention of the present application will become more apparent from the following description of preferred embodiments of the invention.

DETAILED DESCRIPTION OF THE PREFERRED EMBODIMENT

The preferred embodiments of the present invention will be described below with reference to the accompanying drawings.

Figure 1:
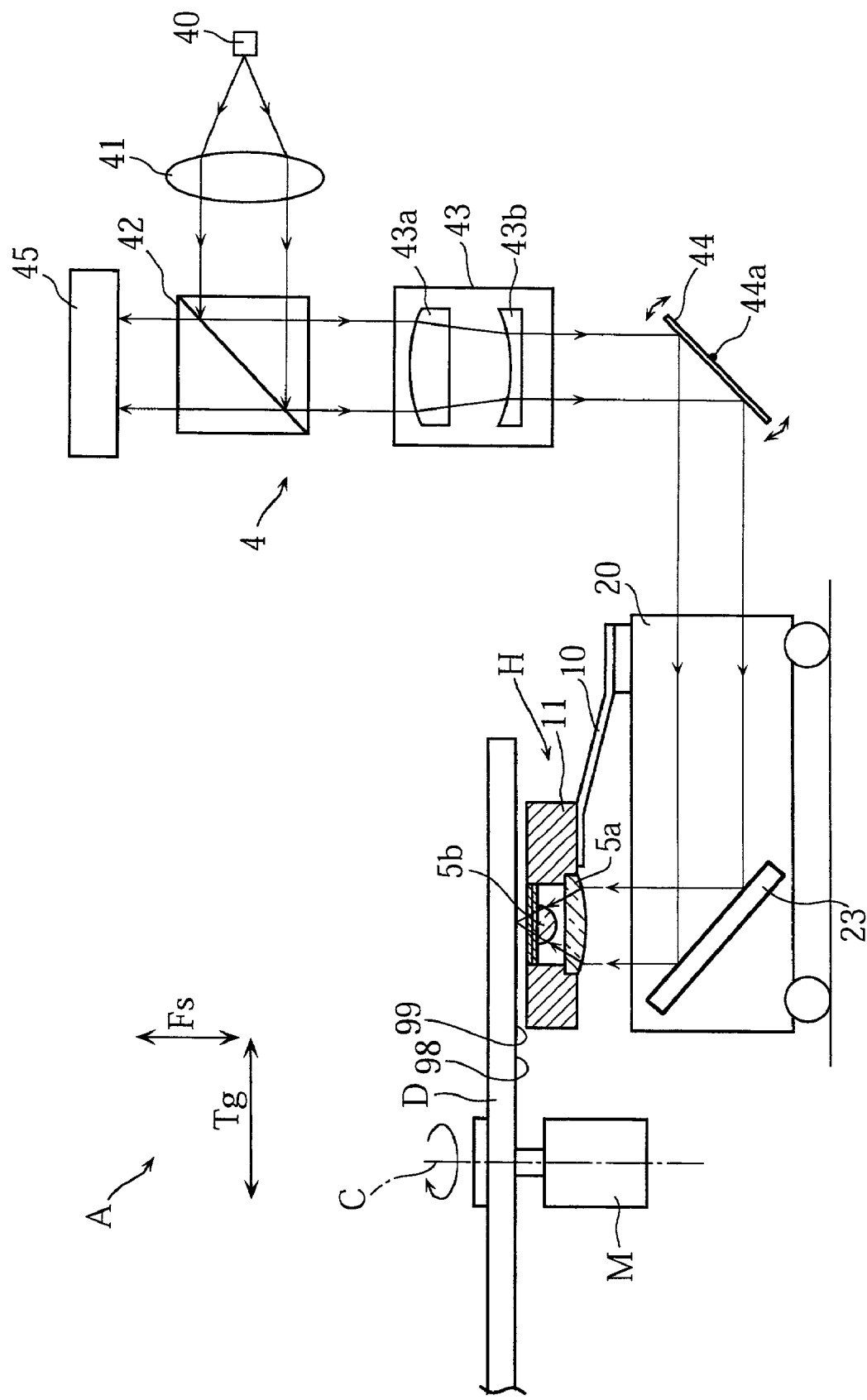
FIG. 1 is a schematic explanatory view showing an embodiment of the invention of the present application.

FIG. 1 shows an embodiment of the present invention. The optical information processing apparatus A of this embodiment is constituted as a magneto-optical disk apparatus capable of recording of data to and playback of data from a magneto-optical disk D. The optical head H provided in the optical information processing apparatus A is thus constituted as a magneto-optical head.

The optical head H comprises a slider 11 that is supported on a carriage 20 via a suspension 10, two objective lenses 5a and 5b mounted on the slider 11, and other prescribed members that will be described below with reference to FIGS. 2 and 3.

The magneto-optical disk D is capable of rotating at high speed about a central axis C thereof by being driven by a spindle motor M. A lower surface layer part of the magneto-optical disk D is made to be a recording layer 99, and this recording layer 99 is covered by a transparent thin protective film 98. In the present embodiment, a so-called surface recording method is adopted in which the optical head H is made to face and come close to the recording layer 99 of the magneto-optical disk D via the protective film 98.

A standing mirror 23 that receives laser light from a fixed optical unit 4 is mounted on the carriage 20. The fixed optical unit 4 is constituted such that laser light emitted from a laser diode 40 is made into a parallel beam using a collimator lens 41, and the laser light is then made to travel towards the standing mirror 23 via a beam splitter 42, a beam expander 43 and a galvanomirror 44. The laser light led to the standing mirror 23 passes successively through the objective lenses 5a and 5b, and is converged by same. As a result, a beam spot is formed on the recording layer 99 of the magneto-optical disk D. The laser light irradiated onto the magneto-optical disk D is reflected by the recording layer 99, and thus travels back along the optical path described above, and is ultimately split off by the beam splitter 42 and then detected by a light detecting circuit 45.

The beam expander 43 has, for example, two lenses 43a and 43b, and is such that when the laser light passes through the beam expander 43, the effective diameter of the laser light is reduced. By reducing the effective diameter of the laser light in this way, the diameters of the objective lenses 5a and 5b can be reduced, and hence the total weight of the members mounted on the slider 11 can be reduced, which is desirable in terms of improving the operational performance thereof. The galvanomirror 44 is freely rotatable about an axis 44a, and by rotating the galvanomirror 44 about the axis 44a, small adjustments can be made to the direction of reflection of light, and hence tracking control can be carried out.

The carriage 20 can move back and forth freely below the magneto-optical disk D along a tracking direction Tg (the radial direction of the magneto-optical disk D) However, it should be noted that with the invention of the present application, instead of such means using the carriage 20, it is also possible to adopt a constitution in which a swing arm capable of swing in the radial direction of the magneto-optical disk D is used, and the suspension 10 and the slider 11 are supported on this swing arm. The slider 11 is approximately block-shaped overall, and is made, for example, of a ceramic. The suspension 10 can elastically deform freely in a focus direction Fs, and hence when the magneto-optical disk D is rotating at high speed, due to the action of a high-speed air current that flows in between the slider 11 and the magneto-optical disk D, the slider 11 floats up from the magneto-optical disk D with a very small gap therebetween.

Figure 2:
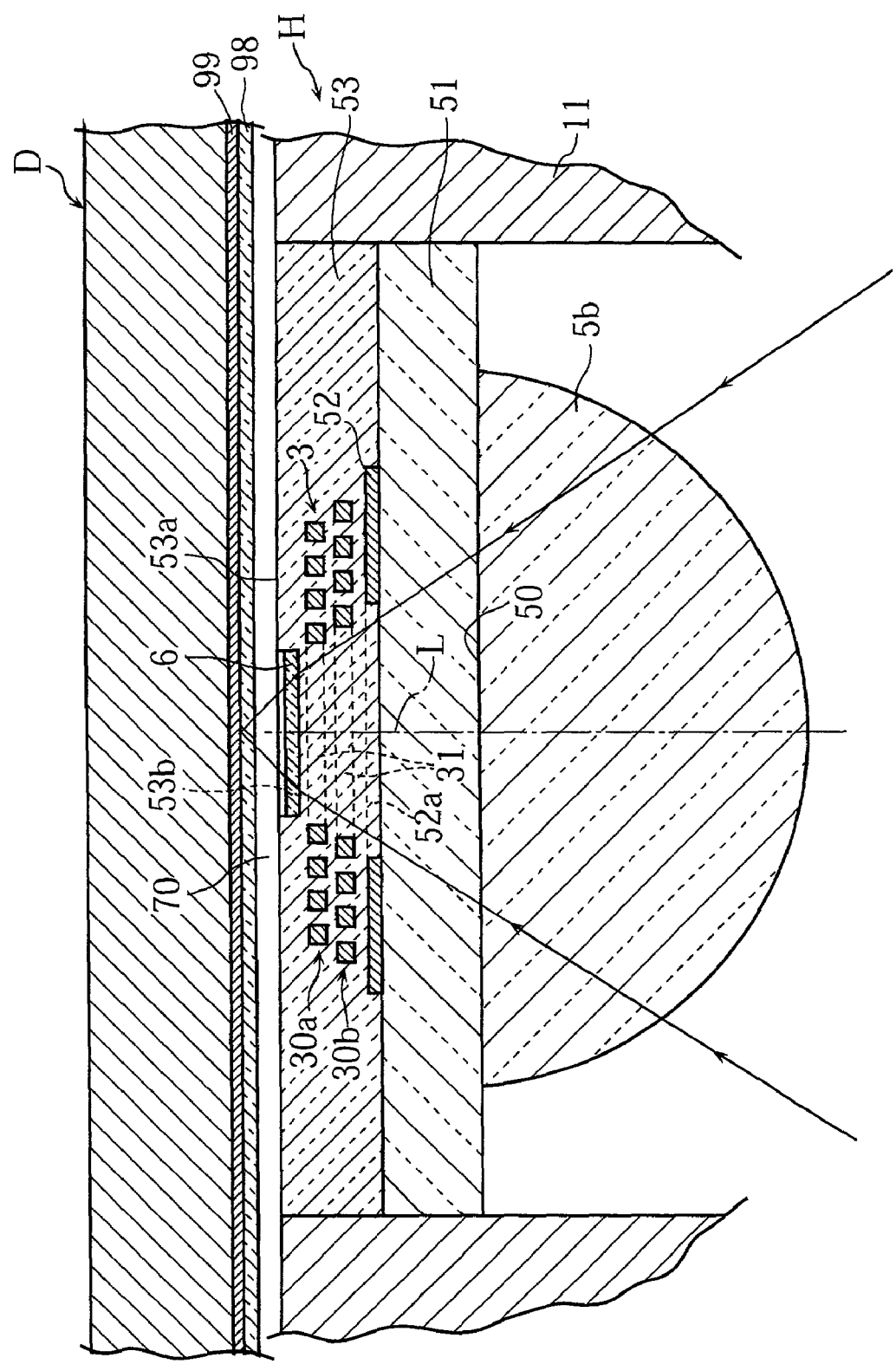
FIG. 2 is an enlarged sectional view of main parts shown in FIG. 1.

As shown in FIG. 2, a transparent substrate 51 is bonded onto a planar upper lens surface 50 of the objective lens 5b, and a magnetic film 52, a coil 3, an insulating protective film 53 and a light reflection preventing film 6 are provided on the transparent substrate 51.

The transparent substrate 51 fulfills a role as a substrate for forming the magnetic film 52, the coil 3 and the like thereupon, and is made of glass having the same or approximately the same refractive index as the objective lens 5b. The insulating protective film 53 is made of a transparent substance such as alumina, again having the same or approximately the same refractive index. The objective lens 5b, the transparent substrate 51 and the insulating protective film 53 are thus essentially integrated to constitute a single lens. The thickness of the objective lens 5b itself is thinner by an amount equal to the thickness of the transparent substrate 51 plus the thickness of the insulating protective film 53.

The magnetic film 52 fulfills a role of making a magnetic field generated by the coil 3 act efficiently at the place where the beam spot is formed on the magneto-optical disk D. The magnetic film 52 may be made of any of various materials, for example an Ni—Fe alloy, an amorphous Co alloy, an Fe—Al—Si alloy, a laminate of an Fe—C alloy and an Ni—Fe alloy, an Fe—Ta—N alloy, or an Mn—Zn ferrite. The magnetic film 52 has a thickness, for example, of about 8 μm, and a hole 52a through which the laser light passes is formed in a central part thereof. Note, however, that the hole 52a is filled by part of the insulating protective film 53.

The coil 3 is formed by patterning a metallic film of copper or the like into a prescribed shape, and can be manufactured, for example, by a wafer process used in semiconductor manufacture. The coil 3 is constituted as a 2-layer structure having two conductor films 30a and 30b. Each of the 2-layer conductor films 30a and 30b is a spiral coil, and electric current flows in the same direction through both of the conductor films 30a and 30b. However, the present invention is not limited to this constitution, but rather it is also possible for the coil to have a 1-layer structure, or a multi-layer structure with more than 2 layers. The central axis L of the coil 3 coincides with the axis of the objective lenses 5a and 5b. Although not shown in the drawing, a lead wiring part formed from a conductor film for supplying driving electrical power from outside the insulating protective film 53 to the coil 3 is formed in a prescribed part extending from the coil 3 to a side of the insulating protective film 53. Moreover, the optical head H is preferably made to have a constitution in which a film having good thermal conductivity for aiding the dissipation of heat generated by the coil 3 to the outside is provided in the proximity of the coil 3 inside the insulating protective film 53. The central part of the coil 3 is also filled by part of the insulating protective film 53, and forms a light-transmitting part 31 through which the laser light passes. The diameter of the light-transmitting part 31 is made as small as possible to reduce the inductance of the coil 3, but must be sufficiently large that the optical path of the laser light is not blocked.

The insulating protective film 53 is formed on top of the transparent substrate 51 so as to cover the magnetic film 52 and the coil 3. An upper surface 53a of the insulating protective film 53 faces the magneto-optical disk D with an air layer 70 therebetween. The surface 53a is basically planar and flush with the upper surface of the slider 11, but a recessed part 53b with an opening at the top part thereof is provided in part of the surface 53a. The recessed part 53b has a circular shape centered on the axis L of the objective lens 5b, and as shown in FIG. 3, the diameter Da of the recessed part 53b is slightly larger than the diameter Db of the beam of laser light at the surface 53a (strictly, at the base of the recessed part 53b).

The light reflection preventing film 6 is provided inside the recessed part 53b. Examples of the specific material from which the light reflection preventing film 6 is made include silicon oxide, tungsten oxide, magnesium fluoride and silicon nitride. The light reflection preventing film 6 may be a single-layer film made of one of the above materials, or may have a multi-layer structure in which two or more types of film are formed on top of one another (for example, a two-layer structure of a $Ta_2O_5$, film and an $MgF_2$ film). The depth h of the recessed part 53b is, for example, 130 nm, whereas the thickness t of the light reflection preventing film 6 is smaller than this, for example 124 nm, so that part of the light reflection preventing film 6 does not project out upwards beyond the surface 53a of the insulating protective film 53.

As can be understood from the above description, in the case that the light reflection preventing film 6 has a single-layer structure and the refractive index thereof is n, then taking the thickness of the light reflection preventing film 6 to be d, the reflectance of light of wavelength A is minimized when the equation $n \cdot d = \lambda/4$ is satisfied, and hence the thickness of the light reflection preventing film 6 is optimized to be as close as possible to the value for which this equation is satisfied. In this case, if the depth of the recessed part 53b is made to be larger than $1/4n$ times the wavelength λ of the laser light then a light reflection preventing film 6 having the optimum thickness can be formed so as not to project out beyond the surface 53a. In the case that the light reflection preventing film 6 has a multi-layer structure, the above equation cannot be applied as is, but by optimizing the thickness and refractive index of each layer, the amount of reflection of light can still be reduced adequately. The light reflection preventing film 6 can be formed by vapor deposition or sputtering. The recessed part 53b can be formed, for example, by etching the insulating protective film 53, or by covering a part that will become the recessed part 53b with a resist during the formation process of the insulating protective film 53 and then building up the insulating protective film 53 in other parts such that the covered part becomes a recessed part. However, the method of forming the recessed part 53b is not limited to these methods.

A description will now be given of the operation of the optical head H.

A magnetic field modulation method, for example, is adopted as the method of recording data to the magneto-optical disk D. In this magnetic field modulation method, by converging the laser light using the objective lenses 5a and 5b to form a beam spot on the recording layer 99 of the magneto-optical disk D, the temperature of the recording layer 99 is made to approach the Curie temperature. In this state, a magnetic field generated and modulated by the coil 3 is applied to the recording layer 99, thus controlling the direction of magnetization of the recording layer 99. This data recording is carried out while rotating the magneto-optical disk D at high speed using the spindle motor M, and with the slider 11 made to be in a state floating up from the magneto-optical disk D with the air layer 70 therebetween.

Figure 3:
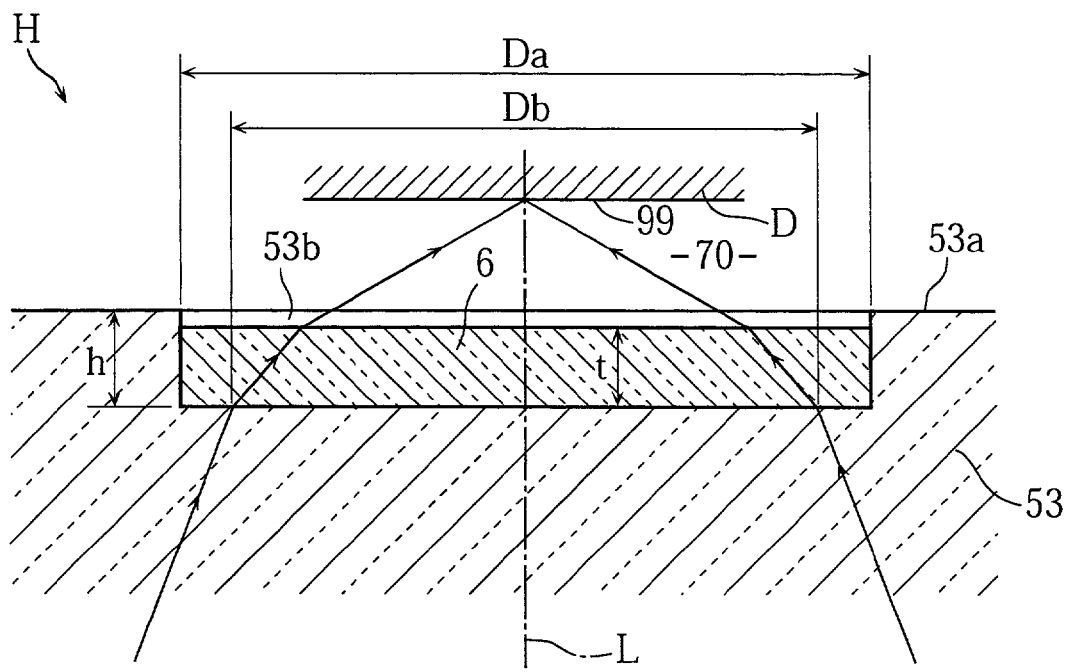
FIG. 3 is an enlarged sectional view of main parts shown in FIG. 2.

When laser light that has passed through the objective lenses 5a and 5b passes through the transparent substrate 51 and enters the insulating protective film 53, this laser light passes through the light reflection preventing film 6 and then exits into the air layer 70 towards the recording layer 99 as shown in FIG. 3. At this time, the laser light is refracted as shown in FIG. 3, but reflection of light at the interface between the insulating protective film 53 and the light reflection preventing film 6 and the interface between the light reflection preventing film 6 and the air layer 70 is suppressed, and hence the efficiency of irradiation of light onto the recording layer 99 is raised.

Because the light reflection preventing film 6 is formed inside the recessed part 53b so as not to project out beyond the surface 53a of the insulating protective film 53, even if the slider 11 and the magneto-optical disk D happen to approach one another such that a situation occurs in which the surface 53a contacts the magneto-optical disk D, the light reflection preventing film 6 will not contact the magneto-optical disk D. Moreover, because the light reflection preventing film 6 is housed inside the recessed part 53b and has a structure so as not to be prone to coming out of the recessed part 53b, and moreover because the side surfaces of the light reflection preventing film 6 are in close contact with the side wall surfaces of the recessed part 53b, there is little risk of the light reflection preventing film 6 readily peeling off from the insulating protective film 53 due to shock that occurs when the magneto-optical disk D and the slider 11 contact one another. The light reflection preventing film 6 can thus be protected for a prolonged period.

The content of the present invention is not limited to the embodiment described above. Rather, various design modifications may freely be carried out to the specific constitution of each of the parts of the optical head and the optical information processing apparatus of the present invention.

Figure 4:
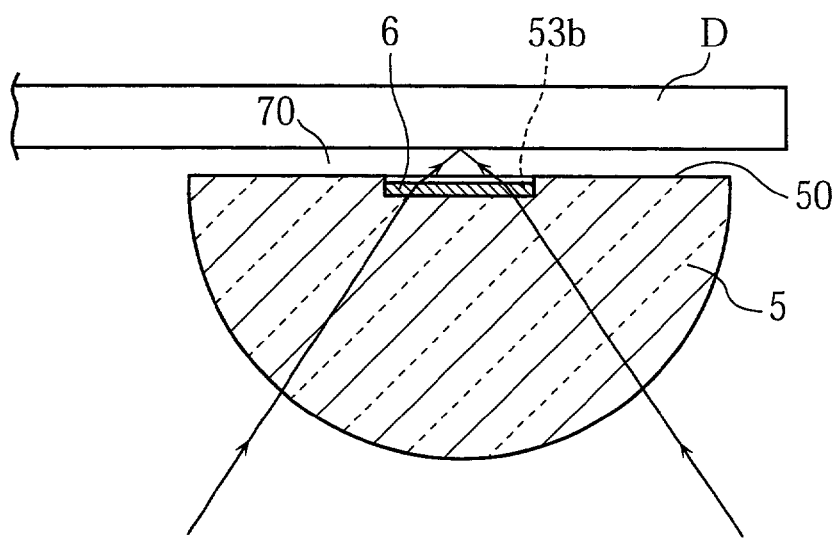
FIG. 4 is a sectional view of main parts showing another embodiment of the invention of the present application.
Figure 5:
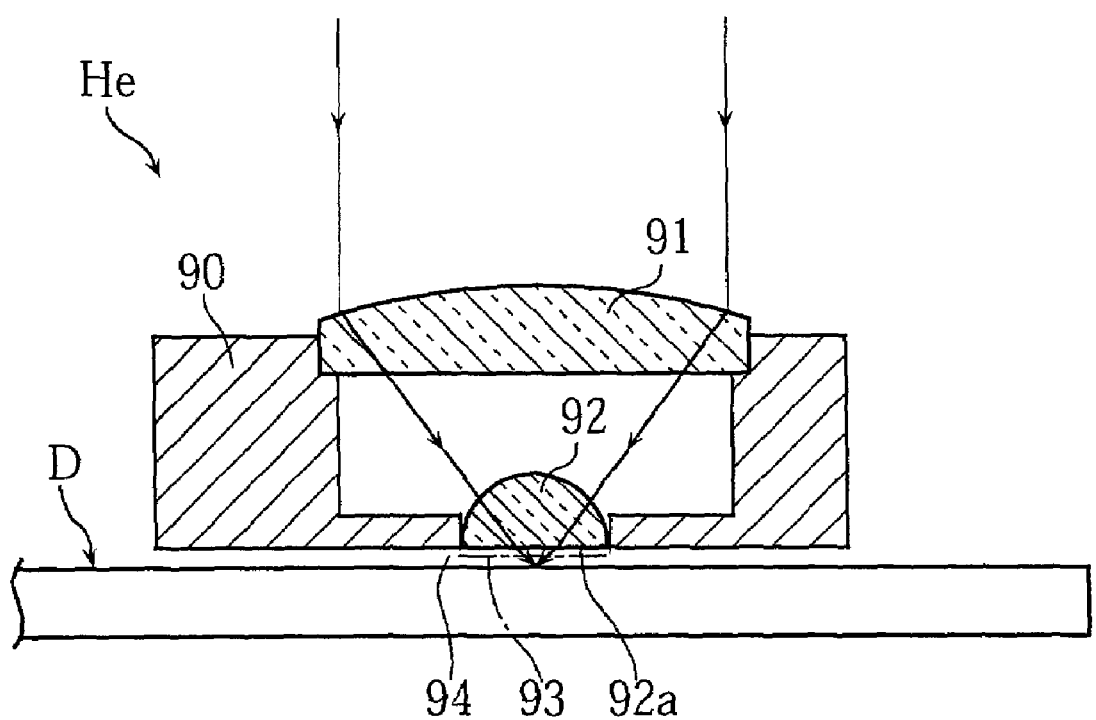
FIG. 5 is a sectional view of main parts showing an example of conventional art.

For example, according to the present invention, a constitution may be adopted in which the recessed part 53b is formed directly in the lens surface 50 of the objective lens 5 that faces the magneto-optical disk D with the air layer 70 therebetween, and the light reflection preventing film 6 is provided inside this recessed part 53b, as shown in FIG. 4. In this way, the surface in which the recessed part with the light reflection preventing film formed therein is provided may be part of the objective lens, or as in the above-described embodiment, may be formed from a member or material that is provided separately to the objective lens. Moreover, the optical head according to the present invention may be constituted so as not to have a magnetic field generating coil.

The optical head according to the present invention is not limited to being a floating slider type, but can also, for example, be made to have a constitution in which a lens holder that holds the objective lenses can be moved freely in the focus direction or the tracking direction using the driving force of an actuator.

As described above, according to the optical head and optical information processing apparatus of the present invention, damage to the light reflection preventing film can be suitably prevented, and hence the efficiency of irradiation of light onto the optical recording medium can be maintained in a good state for a prolonged period.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical head comprising:
   an objective lens;
   an outermost light-emitting surface that directly faces an optical recording medium for contact therewith and from which a light beam converged by the objective lens exits towards the optical recording medium; and
   a light reflection preventing film that is provided at the outermost light-emitting surface;
   wherein the outermost light-emitting surface is formed with a recess in which the light reflection preventing film is provided farther from the recording medium than the outermost light-emitting surface.

2. The optical head according to claim 1, wherein the light reflection preventing film has a refractive index of n, the recess having a depth which is no smaller than ¼n times a wavelength of the light beam.

3. The optical head according to claim 1, further comprising a magnetic field generating coil and a transparent insulating protective film that covers the coil, wherein the coil is disposed between the objective lens and the optical recording medium and provided with a central light-transmitting part for transmitting light converged by the objective lens, the insulating protective film including a surface serving as the outermost light-emitting surface.

4. The optical head according to claim 1, wherein the objective lens includes a lens surface serving as the outermost light-emitting surface.

5. The optical head according to claim 1, further comprising a slider that holds the objective lens and floats up from the optical recording medium when the optical recording medium rotates.

6. An optical information processing apparatus comprising:
   a suspension; and
   an optical head which is supported by the suspension and includes an objective lens for converging a light beam, an outermost light-emitting surface for allowing the light beam to exit towards an optical recording medium while directly facing the optical recording medium for contact therewith, and a light reflection preventing film; wherein the outermost light-emitting surface is formed with a recess in which the light reflection preventing film is provided farther from the recording medium than the outermost light-emitting surface.

7. The apparatus according to claim 6, wherein the light reflection preventing film has a refractive index of n, the recess having a depth which is no smaller than ¼n times a wavelength of the light beam.

8. The apparatus according to claim 6, wherein the optical head further comprises a magnetic field generating coil and a transparent insulating protective film that covers the coil, the insulating protective film including a surface that serves as the outermost light-emitting surface.

9. The apparatus according to claim 8, wherein the coil is disposed between the objective lens and the optical recording medium, the coil being provided with a central light-transmitting part for transmitting light converged by the objective lens.

10. The apparatus according to claim 6, wherein the objective lens includes a lens surface serving as the outermost light-emitting surface.

11. The apparatus according to claim 6, wherein the optical head further comprises a slider that holds the objective lens and floats up from the optical recording medium when the optical recording medium rotates.

12. An optical head comprising:
    an objective lens;
    a light-emitting surface that faces an optical recording medium and from which a light beam converged by the objective lens exits towards the optical recording medium;
    a light reflection preventing film that is provided at the light-emitting surface;
    a magnetic filed generating coil; and
    a transparent insulating protective film that covers the coil;

wherein the light-emitting surface is formed with a recess in which the light reflection preventing film is provided; and wherein the coil is disposed between the objective lens and the optical recording medium and provided with a central light-transmitting part for transmitting light converged by the objective lens, the insulating protective film including a surface serving as the light-emitting surface.

13. An optical information processing apparatus comprising:

a suspension; and an optical head which is supported by the suspension and includes an objective lens for converging a light beam, a light-emitting surface for allowing the light beam to exit towards an optical recording medium, and a light reflection preventing film;

wherein the light-emitting surface is formed with a recess in which the light reflection preventing film is provided; and wherein the optical head further comprises a magnetic field generating coil and a transparent insulating protective film that covers the coil, the insulating protective film including a surface that serves as the light-emitting surface.

14. The apparatus according to claim 13, wherein the coil is disposed between the objective lens and the optical recording medium, the coil being provided with a central light-transmitting part for transmitting light converged by the objective lens.

* * * * *